(12) United States Patent
Lee et al.

(10) Patent No.: US 12,192,477 B2
(45) Date of Patent: Jan. 7, 2025

(54) QUANTUM PARAMETER CONTROL AND THE METHOD THEREOF

(71) Applicant: Samsung Electronics Co., Ltd., Suwon-si (KR)

(72) Inventors: Kyungil Lee, Suwon-si (KR); Bonggon Kim, Suwon-si (KR); Hansang Kim, Suwon-si (KR); Jungwon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 207 days.

(21) Appl. No.: 17/580,068

(22) Filed: Jan. 20, 2022

(65) Prior Publication Data

US 2022/0312018 A1  Sep. 29, 2022

Related U.S. Application Data

(63) Continuation of application No. PCT/KR2022/000617, filed on Jan. 13, 2022.

(30) Foreign Application Priority Data

Mar. 23, 2021 (KR) .......................... 10-2021-0037069

(51) Int. Cl.
*H04N 19/146* (2014.01)
*H04N 19/124* (2014.01)
(Continued)

(52) U.S. Cl.
CPC ......... *H04N 19/146* (2014.11); *H04N 19/124* (2014.11); *H04N 19/167* (2014.11); *H04N 19/176* (2014.11)

(58) Field of Classification Search
None
See application file for complete search history.

(56) References Cited

U.S. PATENT DOCUMENTS

| 5,552,832 A | * | 9/1996 | Astle | ................. | H04N 19/107 |
| | | | | | 375/E7.193 |
| 6,763,138 B1 | | 7/2004 | Yokoyama | | |

(Continued)

FOREIGN PATENT DOCUMENTS

| JP | 3508916 B2 | 3/2004 |
| JP | 2016-051926 A | 4/2016 |

(Continued)

OTHER PUBLICATIONS

International Search Report with Written Opinion dated Apr. 22, 2022, issued in International Patent Application No. PCT/KR2022/000617.

*Primary Examiner* — Clifford Hilaire
(74) *Attorney, Agent, or Firm* — Jefferson IP Law, LLP

(57) ABSTRACT

An electronic device is provided. The electronic device includes a memory and a processor operatively connected to the memory, wherein the processor may obtain a maximum allowable bit rate of the electronic device, determine a maximum quantization value for encoding an image composed of at least one frame, obtain a first bitrate by encoding a first frame set of the image with a quantization value equal to or less than the maximum quantization value, increase the maximum quantization value in response to the obtained first bitrate exceeding the maximum allowable bitrate, decrease the maximum quantization value in response to the obtained first bitrate being less than or equal to the maximum allowable bitrate, obtain a second bitrate by encoding a second frame set subsequent to the first frame set of the image based on the increased or decreased maximum quantization value, increase the maximum quantization value in response to the obtained second bitrate exceeding the maximum allowable bitrate, and decrease the maximum quanti- (Continued)

zation value in response to the obtained second bitrate being less than or equal to the maximum allowable bitrate.

17 Claims, 14 Drawing Sheets

(51) Int. Cl.
*H04N 19/167* (2014.01)
*H04N 19/176* (2014.01)

(56) References Cited

U.S. PATENT DOCUMENTS

| | | | |
|---|---|---|---|
| 10,129,551 B2 | 11/2018 | Kimura et al. | |
| 10,356,406 B2 | 7/2019 | Kuusela | |
| 10,362,307 B2 | 7/2019 | Hong et al. | |
| 2008/0165861 A1* | 7/2008 | Wen | H04N 19/176 375/E7.176 |
| 2009/0052551 A1 | 2/2009 | Kitamura | |
| 2009/0122862 A1 | 5/2009 | Huguenel et al. | |
| 2012/0236935 A1* | 9/2012 | Dutt | H04N 19/103 375/240.03 |
| 2015/0237375 A1* | 8/2015 | Okamoto | H04N 19/14 375/240.2 |
| 2016/0100166 A1 | 4/2016 | Dragne et al. | |
| 2017/0208328 A1* | 7/2017 | Kuusela | H04N 19/167 |
| 2017/0280139 A1 | 9/2017 | Thirumalai et al. | |
| 2019/0281300 A1* | 9/2019 | Guo | H04N 19/142 |
| 2020/0374527 A1 | 11/2020 | Danielsson Fan et al. | |

FOREIGN PATENT DOCUMENTS

| | | |
|---|---|---|
| KR | 10-1238487 B1 | 3/2013 |
| KR | 10-1251000 B1 | 4/2013 |
| KR | 10-2017-0068499 A | 6/2017 |
| KR | 10-2018-0082381 A | 7/2018 |
| KR | 10-2020-0135159 A | 12/2020 |

\* cited by examiner

FIG. 5A

QUANTUM PARAMETER CONTROL AND THE METHOD THEREOF

CROSS-REFERENCE TO RELATED APPLICATION(S)

This application is a continuation application, claiming priority under § 365(c), of an International application No. PCT/KR2022/000617, filed on Jan. 13, 2022, which is based on and claims the benefit of a Korean patent application number 10-2021-0037069, filed on Mar. 23, 2021, in the Korean Intellectual Property Office, the disclosure of which is incorporated by reference herein in its entirety.

TECHNICAL FIELD

The disclosure relates to an electronic device. More particularly, the disclosure relates to a method for encoding an image through an increase/decrease of a maximum quantization value in an electronic device.

BACKGROUND ART

In line with development of mobile communication technologies and hardware/software technologies, portable electronic devices (hereinafter, referred to as electronic devices) have become able to implement various functions in addition to conventional communication functions. An electronic device may use at least one camera module mounted on the front surface and/or rear surface so as to capture images and videos.

For example, an electronic device may determine the quality of captured images by determining the resolution and the target bitrate. The resolution may be determined by the number of pixels used by the output device to express images, and the bitrate may be determined by the amount of data compressed per determined time. The larger the target bitrate, the higher the quality of encoded images, but the larger storage capacity is necessary, the smaller the target bitrate, the lower the quality of encoded images, but little storage may be occupied.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

A conventional electronic device generates an image after determining the target bitrate in connection with the image to be recorded, and, for this reason, an increase in complexity of the image makes it difficult to record the original image with the predetermined target bitrate, and image quality degradation may occur. In addition, if a high target bitrate is configured to encode a complex image with a high quality, unnecessary data is also encoded, and the content size may thus increase excessively.

A conventional electronic device may analyze image characteristics and then adjust the bitrate in real time, or may encode an image once and then encode the same again through a post-processing process (2PASS encoding), but real-time processing may be difficult.

Aspects of the disclosure are to address at least the above-mentioned problems and/or disadvantages and to provide at least the advantages described below. Accordingly, an aspect of the disclosure is to provide a method for encoding images. When an electronic device encodes an image as described above, the bitrate is adjusted in real time by adjusting the quantization value of a macroblock such that a complex image may be encoded with a high image quality without requiring an excessively large storage capacity.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a memory, and a processor operatively connected to the memory, wherein the processor is configured to obtain a maximum allowable bitrate of the electronic device, determine a maximum quantization value for encoding an image composed of at least one frame, obtain a first bitrate by encoding a first frame set of the image with a quantization value equal to or less than the maximum quantization value, increase the maximum quantization value in response to the obtained first bitrate exceeding the maximum allowable bitrate, decrease the maximum quantization value in response to the obtained first bitrate being less than or equal to the maximum allowable bitrate, obtain a second bitrate by encoding a second frame set subsequent to the first frame set of the image, based on the increased or decreased maximum quantization value, increase the maximum quantization value in response to the obtained second bitrate exceeding the maximum allowable bitrate, and decrease the maximum quantization value in response to the obtained second bitrate being less than or equal to the maximum allowable bitrate.

In accordance with another aspect of the disclosure, a method of encoding with adjusting a maximum quantization value is provided. The method includes obtaining a maximum allowable bitrate of an electronic device, determining a maximum quantization value of an image composed of at least one frame, obtaining a first bitrate by encoding a first frame set of the image with a quantization value equal to or less than the maximum quantization value, increasing the maximum quantization value in response to the obtained first bitrate exceeding the maximum allowable bitrate, decreasing the maximum quantization value in response to the obtained first bitrate being less than or equal to the maximum allowable bitrate, obtaining a second bitrate by encoding a second frame set subsequent to the first frame set of the image, based on the increased or decreased maximum quantization value, increasing the maximum quantization value in response to the obtained second bitrate exceeding the maximum allowable bitrate, and decreasing the maximum quantization value in response to the obtained second bitrate being less than or equal to the maximum allowable bitrate.

Advantageous Effects of Invention

According to various embodiments of the disclosure, a maximum quantization value may be configured, and a quantization value may be controlled with regard to each macroblock inside a frame, thereby applying a partially high bitrate only to a region requiring high-quality encoding. If the maximum allowable bitrate is exceeded due to an increase in image complexity, the maximum quantization value may be increased to lower the image bitrate.

According to various embodiments of the disclosure, at least a partial region of an encoded image may be designated as a region of interest. An electronic device may configure the maximum quantization value of the area of interest to be lower than that of peripheral regions such that the encoded image has a relatively high level of quality in the region of interest.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 5A illustrates a quantization value set for each macroblock when a maximum quantization value of an image is not set according to an embodiment of the disclosure;

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
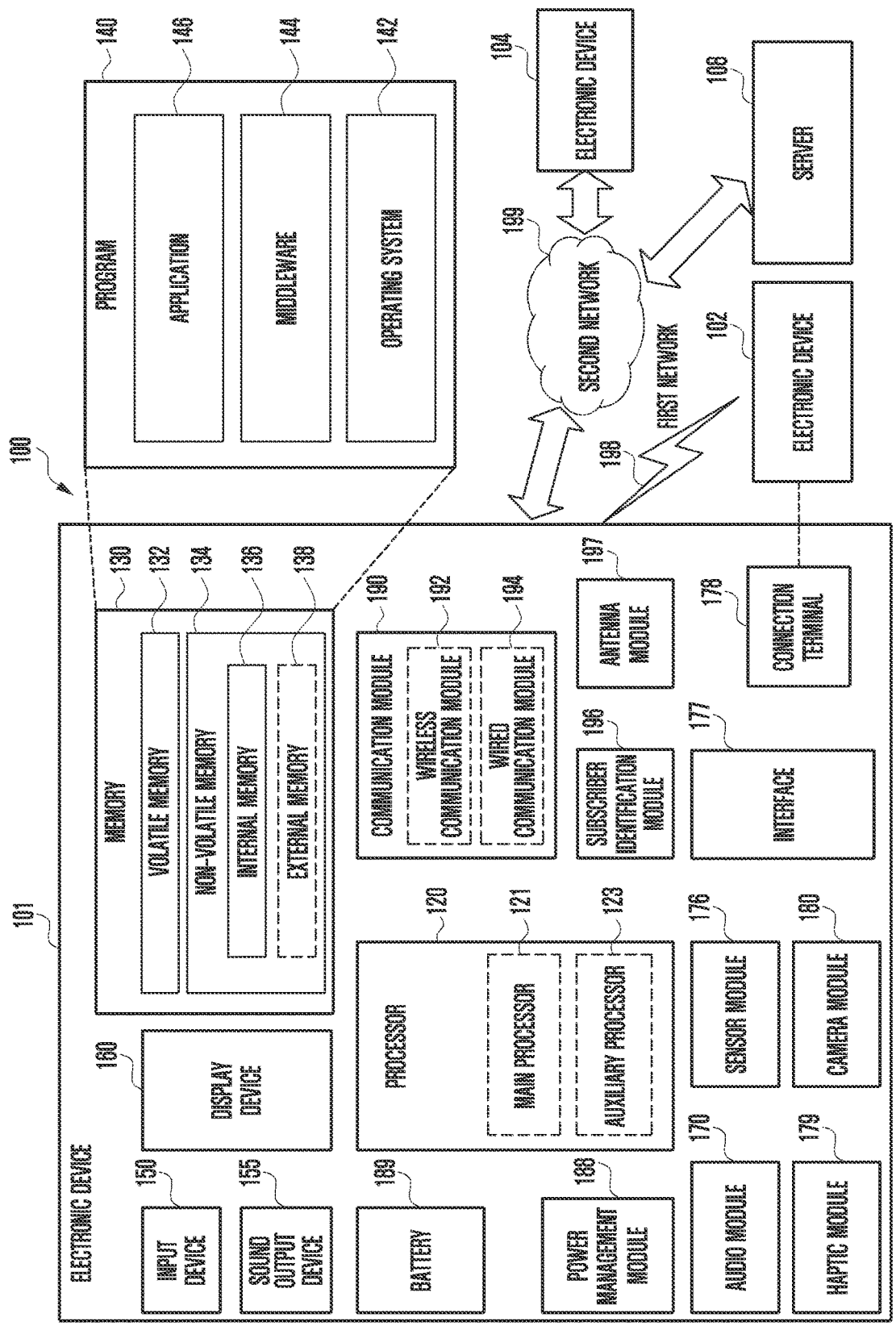
FIG. 1 is a block diagram of an electronic device in a network environment according to an embodiment of the disclosure.

FIG. 1 is a block diagram of an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
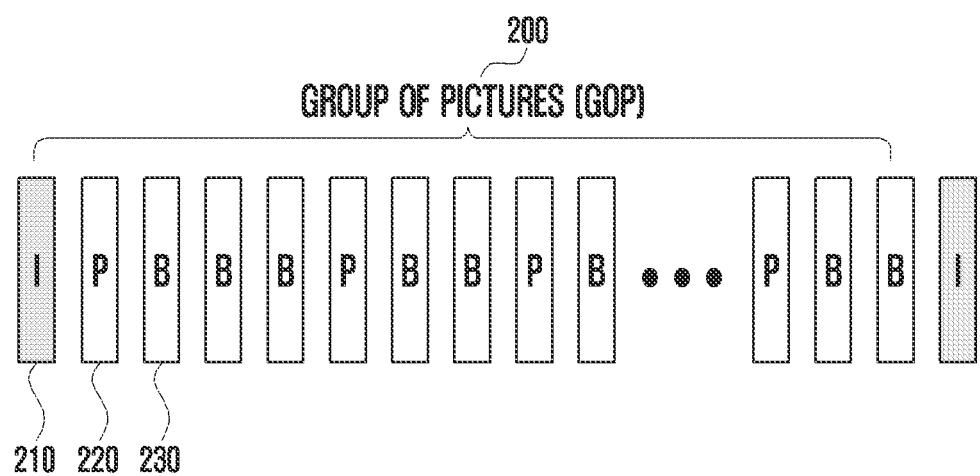
FIG. 2 illustrates a frame set in an image according to an embodiment of the disclosure.

FIG. 2 illustrates a frame set in an image according to an embodiment of the disclosure.

Referring to FIG. 2, an original image is composed of at least one frame, and an electronic device (e.g., the electronic device 101 of FIG. 1) may encode an image in units of group of pictures (GOP) including a frame set 200 composed of at least one frame. According to an embodiment, a processor (e.g., the processor 120 of FIG. 1) may determine a frame number (e.g., GOP number) to be included in the frame set 200 in consideration of a target bitrate and image quality. According to various embodiments, the frame may be any one of an intra frame 210 (or key frame), a predicted frame 220, and a bidirectional frame 230.

According to various embodiments, the intra frame 210 is a core frame that is a reference of the frame set 200, and may be located at the beginning of all frame sets 200. According to an embodiment, the processor may store the original input to the intra frame 210 as it is without referring to other frames like the predicted frame 220 and the bidirectional frame 230.

According to various embodiments, the processor may predict only data having a difference based on the intra frame 210 positioned immediately before and store the data in the predicted frame 220. The predicted frame 220 may have a considerably smaller storage utilization than the intra frame 210 (e.g., ⅓ of the intra frame storage utilization).

According to various embodiments, the processor may refer to both the intra frame 210 and the predicted frame 220, and store data estimating motion between the two frames in at least one bidirectional frame 230. The bidirectional frame 230 may have a much smaller storage utilization (e.g., ⅓ of predicted frame storage utilization) than the predicted frame 220. For example, when the predicted frame 220 and the bidirectional frame 230 are used, an image having a smaller storage utilization may be encoded than when only the intra frame 210 is used.

According to various embodiments, the processor may determine the frame set 200 including at least one intra frame 210, the predicted frame 220, and the bidirectional frame 230. The frame set 200 may be continuous. For example, the next frame of the last frame of the first frame set may be the first frame (intra frame) of the second frame set consecutive to the first frame set. According to an embodiment, the processor may determine the frame number by determining the number of the predicted frame 220 and the bidirectional frame 230 in one frame set 200.

According to various embodiments, a frame may include at least one macroblock. The macroblock is a prediction unit obtained by grouping at least one pixel for motion prediction, and the processor may encode an image in units of macroblocks. According to various embodiments, the processor may set a different quantization value for each macroblock.

Figure 3:
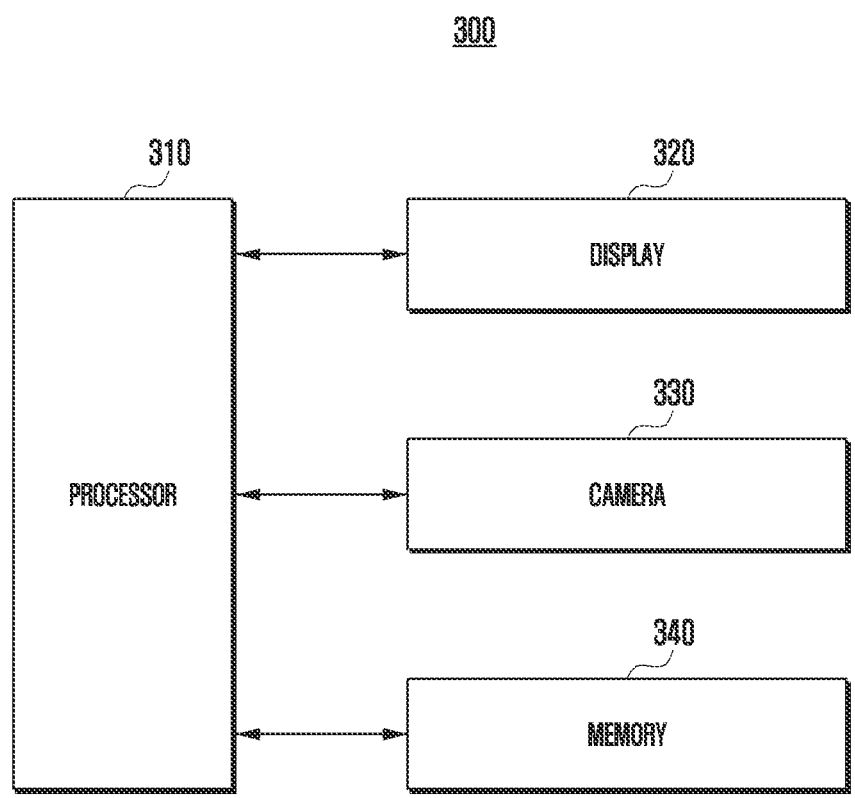
FIG. 3 is a block diagram of an electronic device according to an embodiment of the disclosure.

FIG. 3 is a block diagram of an electronic device according to an embodiment of the disclosure.

Referring to FIG. 3, an electronic device 300 may include a display 320, a camera 330, a processor 310, and a memory 340, and in various embodiments, some of the illustrated components may be omitted or replaced. The electronic device 300 may further include at least some of the configurations and/or functions of the electronic device 101 of FIG. 1. At least some of the respective components of the illustrated (or not illustrated) electronic device 300 may be operatively, functionally, and/or electrically connected.

According to various embodiments, the display 320 may display various images under the control of the processor 310. The display 320 may be implemented as any one of a liquid crystal display (LCD), a light-emitting diode (LED) display, a micro LED display, a quantum dot (QD) display, or an organic light-emitting diode (OLED) display, but is not limited thereto. The display 320 may be configured as a touch screen that senses a touch and/or proximity touch (or hovering) input using a user's body part (e.g., a finger) or an input device (e.g., a stylus pen). The display 320 may include at least some of the configurations and/or functions of the display module 160 of FIG. 1.

According to various embodiments, at least a part of the display 320 may be flexible, and may be implemented as a foldable display or a rollable display.

According to various embodiments, the camera 330 may obtain external image data. The camera 330 may obtain image data using various types of image sensors such as a charge coupled device (CCD) or a complementary metal oxide semiconductor (CMOS). The camera 330 may include at least some of the configurations and/or functions of the camera module 180 of FIG. 1. The electronic device 300 may arrange one or more cameras 330 on the front and/or rear of the housing.

According to various embodiments, the memory 340 may temporarily or permanently store various types of data, including a volatile memory (e.g., volatile memory 132 of FIG. 1) and a non-volatile memory (e.g., non-volatile memory 134 of FIG. 1). The memory 340 may include at least some of the configurations and/or functions of the memory 130 of FIG. 1, and may store the program 140 of FIG. 1.

According to various embodiments, the memory 340 may store various instructions that may be executed by the processor 310. Such instructions may include control commands such as arithmetic and logical operations, data movement, input/output, and the like, which can be recognized by the processor 310.

According to various embodiments, the processor 310 may be operatively, functionally, and/or electrically connected to each component (e.g. display 320, camera 330, and memory 340) of the electronic device 300 to perform an operation or data processing related to control and/or communication of each component. The processor 310 may include at least some of the configurations and/or functions of the processor 120 of FIG. 1.

According to various embodiments, there will be no limitations on the operation and data processing functions that the processor 310 can implement on the electronic device 300, but hereinafter, various embodiments for encoding an image in high quality by adjusting a quantization value (e.g., maximum quantization value) will be described. Operations of the processor 310 to be described later may be performed by loading instructions stored in the memory 340.

According to various embodiments, the processor 310 may determine a frame number to encode the original image. The frame number may be the number of frames (e.g., 30) included in one frame set (e.g., the frame set 200 of FIG. 2). The frame number may be preset when the electronic device 300 is manufactured, or may be determined differently according to an image encoded by the processor 310. Hereinafter, an original image will be described as including a first frame set and a second frame set consecutive to the first frame set, but the number of frame sets included in the original image is not limited thereto.

According to various embodiments, the processor 310 may determine a target bitrate for encoding the original image. According to an embodiment, the processor 310 may determine the target bitrate according to the image quality and capacity size of the image to be encoded. For example, when the complexity of the original image is high, the processor 310 may determine a low target bitrate to prevent image quality deterioration, and when the complexity of the original image is low, the processor 310 may determine a high target bitrate to reduce the storage utilization. According to another embodiment, the processor 310 may determine the target bitrate of the original image as a default value without separately determining the target bitrate.

According to various embodiments, the processor 310 may set at least one region of interest (ROI) in a frame set. The processor 310 may determine a region including an important object, a region requiring clear image quality, or a high complexity region in the image as the region of interest. According to an embodiment, the processor 310 may determine the entire screen of the original image as the region of interest. For example, when the screen change of the original image occurs quickly, the processor 310 may determine the entire screen as the region of interest. According to an embodiment, the processor 310 may determine a region including the same object as the region of interest even in frames subsequent to the frame in which the region including one object is determined as the region of interest.

According to an embodiment, the processor 310 may differently determine the region of interest for each frame set or frame. The processor may set an object newly appearing in the frame as a new region of interest. In the case of an image in which a screen change occurs quickly, different objects may appear for each frame, so the processor 310 may set a different region of interest for each frame and/or frame set.

For example, in the image encoded by the processor 310, the first object and the second object may appear in a first frame, and the second object and the third object may appear in a second frame that is continuous to the first frame. In the first frame, the processor may set a first region of interest including the first object and a second region of interest including the second object, and in the second frame, the processor may set a second region of interest including the second object and a third region of interest including the third object. The processor may set priorities of the first region of interest and the second region of interest in the first frame. When the processor sets the priority of the first region of interest to be higher, the processor may set the maximum quantization value of the first region of interest to be lower than that of the second region of interest.

According to an embodiment, the processor may set priorities of the third region of interest newly appearing and the second region of interest in the second frame. Although the priority of the first region of interest is higher than that of the second region of interest in the first frame, the processor may set the priority of the second region of interest to be higher than that of the third region of interest in the second frame. Accordingly, the processor may set the maximum quantization value of the second region of interest to be lower than the maximum quantization value of the third region of interest.

According to various embodiments, the processor 310 may determine the priority of the region of interest. According to an embodiment, the processor 310 may determine the priority according to the frequency of appearance of the object in the entire image. For example, the processor 310 may recognize at least one object in the original image, and determine the priority of the object according to criteria such as at least one of a location, a size, and an appearance frequency of the object for each frame.

According to various embodiments, the processor 310 may obtain a maximum allowable bitrate capable of encoding the original image. According to an embodiment, the maximum allowable bitrate may be determined according to a specification of a hardware codec (HW Codec). The maximum allowable bitrate may be the bitrate that the electronic device 300 may process in real time. For example, the processor 310 may encode even if the bitrate of the original image exceeds the maximum allowable bitrate, but image quality may deteriorate and interruptions may occur.

According to various embodiments, the processor 310 may obtain frame information including at least a portion of brightness, sensitivity, motion, and/or noise information of a frame set. The processor 310 may determine the complexity of the image based on a change amount of at least one of brightness, sensitivity, motion, and/or noise information of a frame set. For example, in the case of an image having many changes in brightness or many motions, it may be determined that the complexity is high. The processor 310 may determine the bitrate to be encoded based on the determination of the complexity of the image. The processor 310 may compress some data in order to identify the maximum allowable bitrate of the codec and encode the image at a bitrate that does not exceed the maximum allowable bitrate.

According to various embodiments, the processor 310 may obtain a bitrate required to encode a frame set based on frame information. The higher the complexity determined based on the frame information, the higher the bitrate required for the processor 310 to encode the frame set. According to an embodiment, the bitrate obtained by the processor 310 may exceed the target bitrate. Because the processor 310 does not compress the image above a certain level by limiting the quantization value, a large bitrate may be required when encoding the image, and when a high-complexity image is to be encoded in high quality, the obtained bitrate may be a value greater than or equal to the initially set target bitrate.

According to various embodiments, the processor 310 may determine a quantization value for each frame of the frame set. According to an embodiment, the processor 310 may determine a different quantization value for each macroblock constituting each frame. In this case, the quantization value cannot exceed the set maximum quantization value. When the maximum quantization value is not set in the uninterested region, the processor 310 may increase the quantization value of the uninterested region to a hardware maximum (e.g., 51). The processor 310 compresses data of a corresponding macroblock based on a quantization value set in the macroblock, and the larger the quantization value, the more data may be compressed. For example, the processor 310 may store data having a small storage utilization by increasing the quantization value. The processor 310 may set a quantization value of a macroblock corresponding to a region of interest among macroblocks to be lower than a quantization value of a macroblock other than the region of interest. For example, the processor may encode an image by allocating a larger capacity to the region of interest, and may encode the image by allocating a small capacity to a macroblock other than the region of interest in order not to exceed the maximum allowable bitrate.

According to an embodiment, the processor 310 may set a lower quantization value for an image with higher correlation. For example, a low quantization value may be set for each macroblock in the frame set with high correlation because the difference between the first frame and the second frame subsequent to the first frame is not large. Conversely, in a frame set having a low correlation due to a large difference between the first frame and the second frame, a high quantization value may be set for each macroblock. This is because, if a low quantization value is set for a frame set with low correlation, the storage utilization of the encoded image may become excessively large.

According to an embodiment, the processor 310 may set a lower quantization value as the search range is wide. If the search range is wide, the processor 310 may refer to more previous frames when encoding the current frame. Conversely, if the search range is narrow, the number of previous frames referenced when encoding the current frame may be small. The higher the number of previous frames referenced, the more likely the processor 310 will find a frame with high relevance, and the smaller the capacity to encode the image. Therefore, the wider the search range, the less the capacity burden, so that a low quantization value may be set.

According to various embodiments, the processor 310 may determine an initial maximum quantization value. According to an embodiment, the processor 310 may set the initial maximum quantization value to be smaller as the region of interest having a higher priority. For example, when the priority of the first region of interest is higher than that of the second region of interest, the processor 310 may set the first initial maximum quantization value of the first region of interest to be higher than the second initial maximum quantization value of the second region of interest. The processor 310 may set a value that does not have an excessively large storage utilization as the initial maximum quantization value while maintaining sufficient image quality. According to an embodiment, the processor 310 may maintain the maximum quantization value not to fall below the initial value. For example, the initial maximum quantization value may be a minimum value of the maximum quantization value.

According to another embodiment, the processor 310 may also set the maximum quantization value in a region other than the region of interest (hereinafter, referred to as an uninterested region). The processor 310 may set an appropriate maximum quantization value in order to reduce the difference in image quality between the region of interest and the uninterested region. The processor 310 may set a higher maximum quantization value in the uninterested region than that of the region of interest. Through this, when the bitrate of the image increases, the processor 310 may minimize the deterioration of the image quality of the region of interest and reduce the bitrate of the uninterested region to encode the image below the maximum allowable bitrate.

According to various embodiments, the processor 310 may determine whether the bitrate of the frame set exceeds the maximum allowable bitrate. According to an embodiment, the processor 310 may obtain the maximum allowable bitrate from the hardware codec and compare it with the bitrate of the obtained frame set. If the maximum allowable bitrate is exceeded, errors such as image quality degradation or stoppage may occur, so the processor 310 may maintain the bitrate below the maximum allowable bitrate by adjusting the maximum quantization value.

According to various embodiments, the processor 310 may adjust the maximum quantization value of the frame set. According to an embodiment, the processor 310 may adjust the maximum quantization value according to the bitrate of the frame set and whether the bitrate of the frame set exceeds the maximum allowable bitrate. For example, the processor 310 may compare the first bitrate of the first frame set with the maximum allowable bitrate to determine which one is large or small. There is no problem when the maximum allowable bitrate is larger, but when the first bitrate is larger, the processor 310 may increase the maximum quantization value of the first frame set. Through this, data of the first frame set may be further compressed, and as a result, the first bitrate may be reduced to a value less than or equal to the maximum allowable bitrate.

Conversely, when the bitrate of the frame set is less than or equal to the maximum allowable bitrate, the processor 310 may decrease the maximum quantization value. According to an embodiment, when the processor 310 decreases the maximum quantization value, the image of the corresponding frame set may be encoded with higher image quality although this causes an amount of the storage utilized to increase. The processor 310 may reduce the maximum quantization value in order to encode a high-definition image by maximally utilizing the resources of the electronic device 300. In this case, the processor 310 cannot reduce the maximum quantization value below the initially set maximum quantization value. For example, the maximum quantization value may be adjusted within a range in which an initially set value becomes a minimum value. If the maximum quantization value is reduced from the initially set value, unnecessary information may be encoded and the amount of the storage utilized may become excessively large. Accordingly, the processor 310 may determine the initial maximum quantization value to be a value in which sufficient image quality is maintained and the storage utilization is not excessively large.

The processor 310 may encode the second frame set with the maximum quantization value increased or decreased in the encoding of the first frame set. Because the second frame set may include a different scene from the first frame set, the position of the region of interest may be moved. The processor 310 may obtain a second bitrate necessary for encoding the second frame set. The processor 310 may determine whether the second bitrate exceeds the maximum allowable bitrate, and if the second bitrate is more than the maximum allowable bit, the maximum quantization value of the region of interest may be increased, and if the second bitrate is less than the maximum allowable bit, the maximum quantization value of the region of interest may be decreased. The processor 310 may encode a next frame set subsequent to the second frame set using the changed maximum quantization value.

According to various embodiments, the processor 310 may determine a resource level of an image for a frame set. The processor 310 may determine the resource level based on at least one of a resolution required to reproduce an image, the number of buffers, and a maximum bitrate required to encode an image. According to an embodiment, because the processor 310 obtains a bitrate required for image encoding according to the set maximum quantization value, the maximum bitrate required for image encoding may exceed the target bitrate. Accordingly, the processor 310 may determine the resource level of the image after the image encoding process is complete.

For example, the processor 310 may determine the first resource level from the first frame set and store the first resource level in the memory 340, determine the second resource level from the second frame set, and compare the first resource level with the second resource level. The processor 310 may maintain the first resource level stored in the memory 340 as it is when the first resource level is higher than the second resource level, and may store the second resource level in the memory 340 instead of the first resource level when the second resource level is higher than the first resource level.

The processor 310 may record the resource level in a stream header of an image. Later, when the encoded image is reproduced, the external playback device may identify the resource level of the stream header and determine the type and number of resources required to reproduce the image.

Figure 4A:
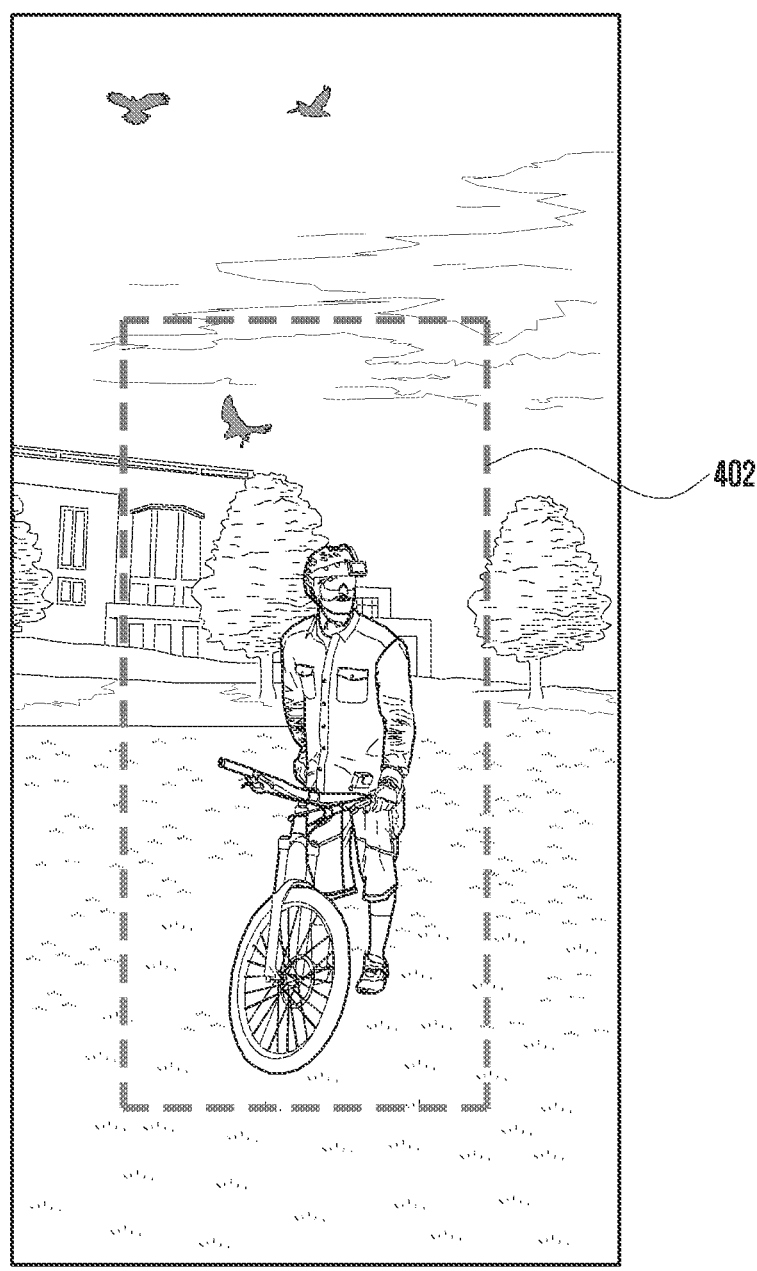
FIGS. 4A, 4B, and 4C illustrate at least one region of interest of an image according to various embodiments of the disclosure.
Figure 4B:
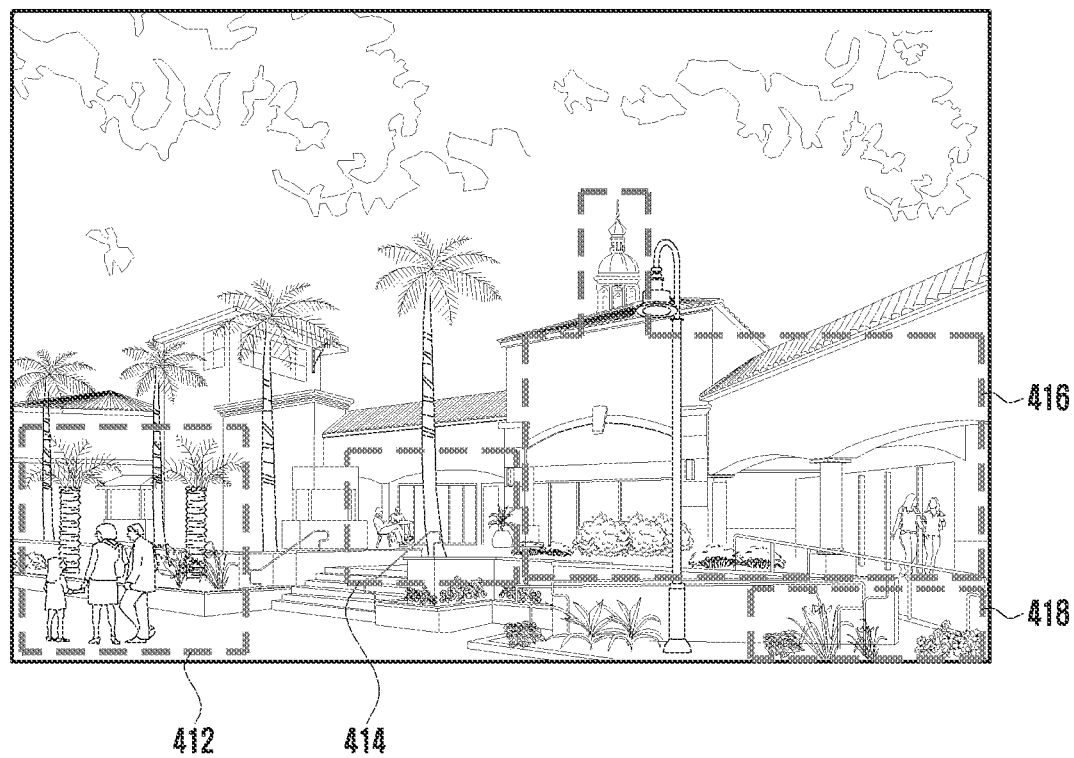
Figure 4C:
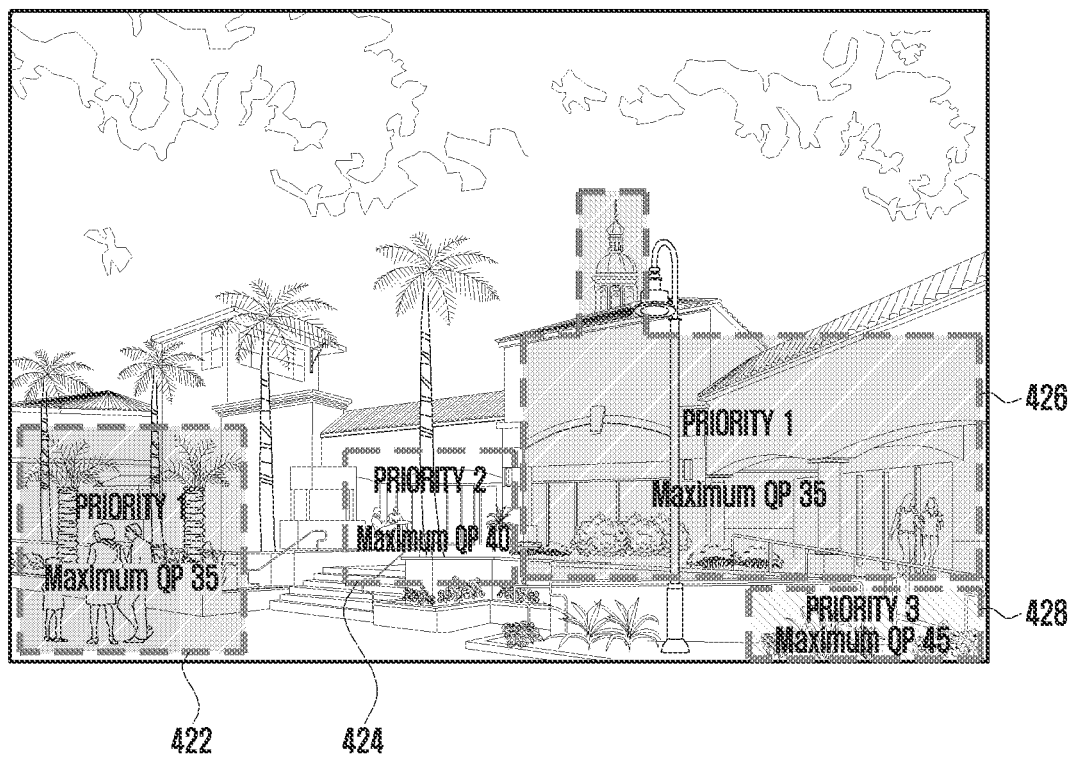

FIGS. 4A, 4B, and 4C illustrate at least one region of interest of an image according to various embodiments of the disclosure.

Referring to FIG. 4A, a region of interest 402 set within a frame of an image is illustrated. According to various embodiments, the processor (e.g., the processor 310 of FIG. 3) may set at least one region of interest 402 within a frame. The region of interest 402 may include at least one object, and as the position of the object changes in successive frames, the position of the region of interest 402 may also change. The processor may determine a region including an important object in the frame and a region in which brightness and motion change rapidly as the region of interest 402. According to an embodiment, the region of interest 402 may be a partial region of a frame or the entire image.

According to various embodiments, the processor may set the maximum quantization value in the region of interest 402. The quantization value that the processor adjusts so as not to exceed the maximum allowable bitrate during the encoding process cannot exceed the set maximum quantization value.

Referring to FIG. 4B, the processor may determine a plurality of regions of interest 402 in a frame. The processor may determine a plurality of regions of interest 402 when there are a plurality of objects in a frame or there are several regions in which brightness and motion change. For example, the processor may determine a first region of interest 412, a second region of interest 414, a third region of interest 416, and a fourth region of interest 418 within a frame. The size of each region of interest and the objects included in the region of interest may all be different.

Referring to FIG. 4C, the processor may set priorities for the plurality of regions of interest 402. According to various embodiments, the processor may determine the maximum quantization value of the region of interest 402 based on the set priority. The processor may set a lower maximum quantization value in the region of interest 402 having a higher priority. For example, the processor may set a first region of interest 422, a second region of interest 424, a third region of interest 426, and a fourth region of interest 428 in the frame. The processor may set the first region of interest 422 and the third region of interest 426 as the first priority, the second region of interest 424 as the second priority, and the fourth region of interest 428 as the third priority, and may set a lower quantization value in a region of interest having a higher priority. For example, the processor may set a first maximum quantization value (e.g., 35) in the first region of interest 422 and the third region of interest 426, a second maximum quantization value (e.g., 40) higher than the first maximum quantization value in the second region of interest 424, and a third maximum quantization value (e.g., 45) higher than the second maximum quantization value in the fourth region of interest 428.

According to various embodiments, the processor may encode an image based on the set maximum quantization value. For example, because the quantization value of the first region of interest 422 and the third region of interest 426 is low, compression occurs relatively less, so that the storage utilization is large and high-definition encoding may be achieved. The second region of interest 424, which is the second priority region of interest, may be encoded with a relatively lower quality than the first priority regions (the first region of interest 422 and the third region of interest 426), and the fourth region of interest 428, which is the third priority region of interest, may be encoded with the lowest image quality. The processor may set the priority of the region of interest relatively low within the frame or located outside the frame.

Figure 5A:
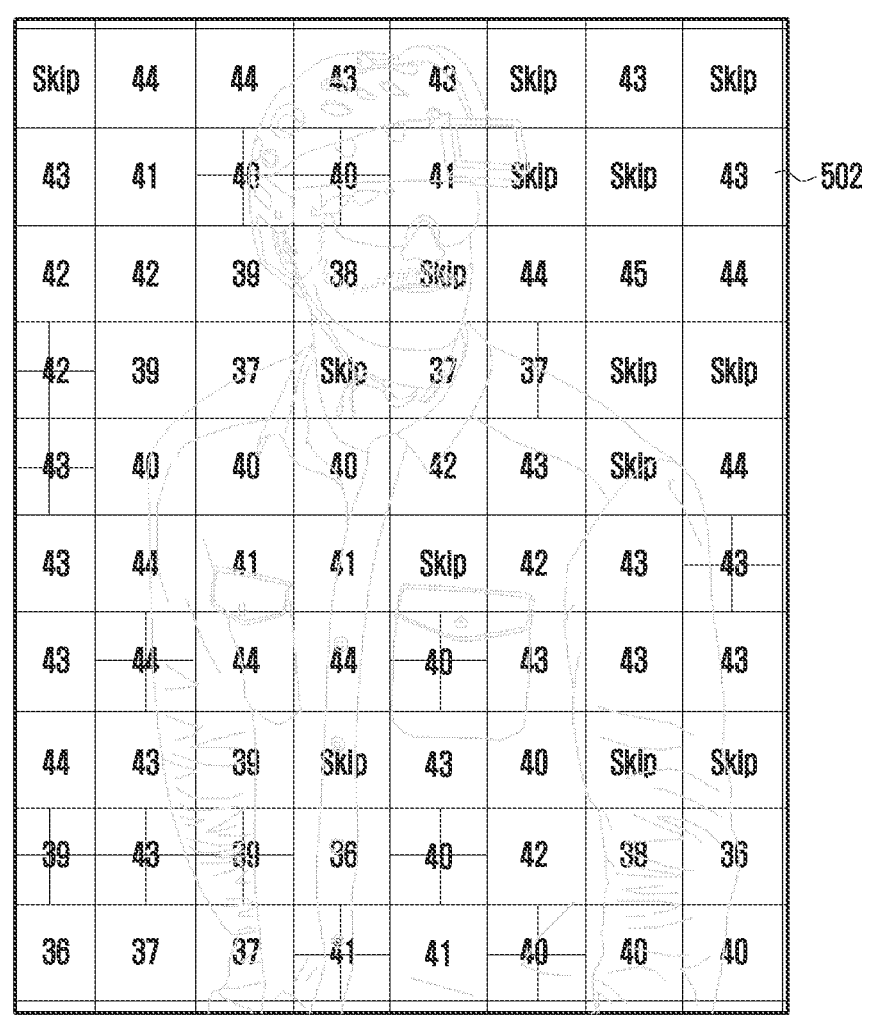

FIG. 5A illustrates a quantization value set for each macroblock when a maximum quantization value of an image is not set according to an embodiment of the disclosure.

Figure 5B:
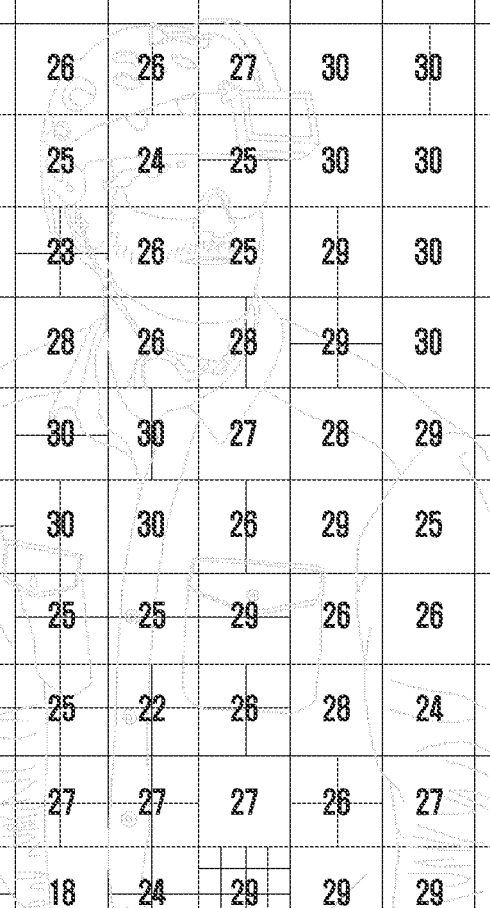
FIG. 5B illustrates a quantization value set for each macroblock when a maximum quantization value of an image is set according to an embodiment of the disclosure.

FIG. 5B illustrates a quantization value set for each macroblock when a maximum quantization value of an image is set according to an embodiment of the disclosure.

Referring to FIGS. 5A and 5B, the processor (e.g., the processor 310 of FIG. 3) may set a quantization value for each macroblock 502 of a frame. According to various embodiments, the processor may obtain the bitrate of a frame set (e.g., the frame set 200 of FIG. 2) based on frame information. The processor may adjust the quantization value so that the bitrate of the frame set does not become excessively large. Because the data of the macroblock 502 having a high quantization value is highly compressed, it may not require a lot of storage space. According to an embodiment, the processor may set a quantization value for each macroblock 502 and change the quantization value based on the obtained bitrate. For example, the processor may obtain the bitrate of the macroblock 502, and when the data is too large, may increase the quantization value to reduce the bitrate of the macroblock 502.

According to various embodiments, the processor may set a maximum quantization value in order to encode an image in high quality. According to an embodiment, the processor may set a region of interest (e.g., the region of interest 402 of FIG. 4A) and set a maximum quantization value applied only to the region of interest. When adjusting the quantization value, the processor cannot increase the quantization value beyond the maximum quantization value if there is a maximum quantization value applied to the macroblock 502. For example, if there is a maximum quantization value applied to the macroblock 502, the processor cannot set a quantization value that exceeds the maximum quantization value even if the bitrate of the macroblock 502 is large and exceeds the target bitrate.

FIG. 5A illustrates quantization values for each macroblock 502 when an image is encoded without setting a maximum quantization value, and FIG. 5B illustrates a case in which the maximum quantization value is set to 30 in the same frame as in FIG. 5A. As illustrated in the figures, when the maximum quantization value is set, it may be confirmed that the same image is encoded with a smaller quantization value. According to various embodiments, the processor may set a maximum quantization value to encode a desired frame set among images in high quality.

Figure 6A:
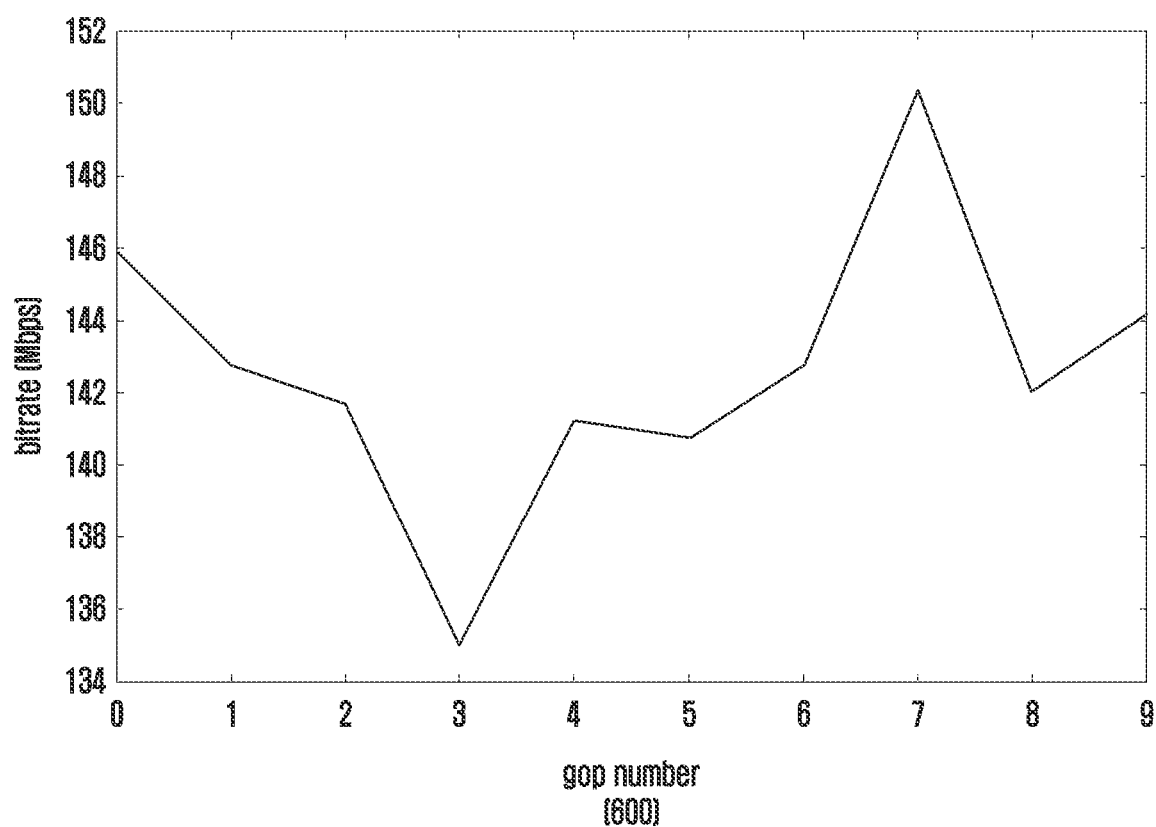
FIG. 6A illustrates a bitrate when an image is encoded without adjusting a maximum quantization value according to an embodiment of the disclosure.

FIG. 6A illustrates a bitrate when an image is encoded without adjusting a maximum quantization value according to an embodiment of the disclosure.

Figure 6B:
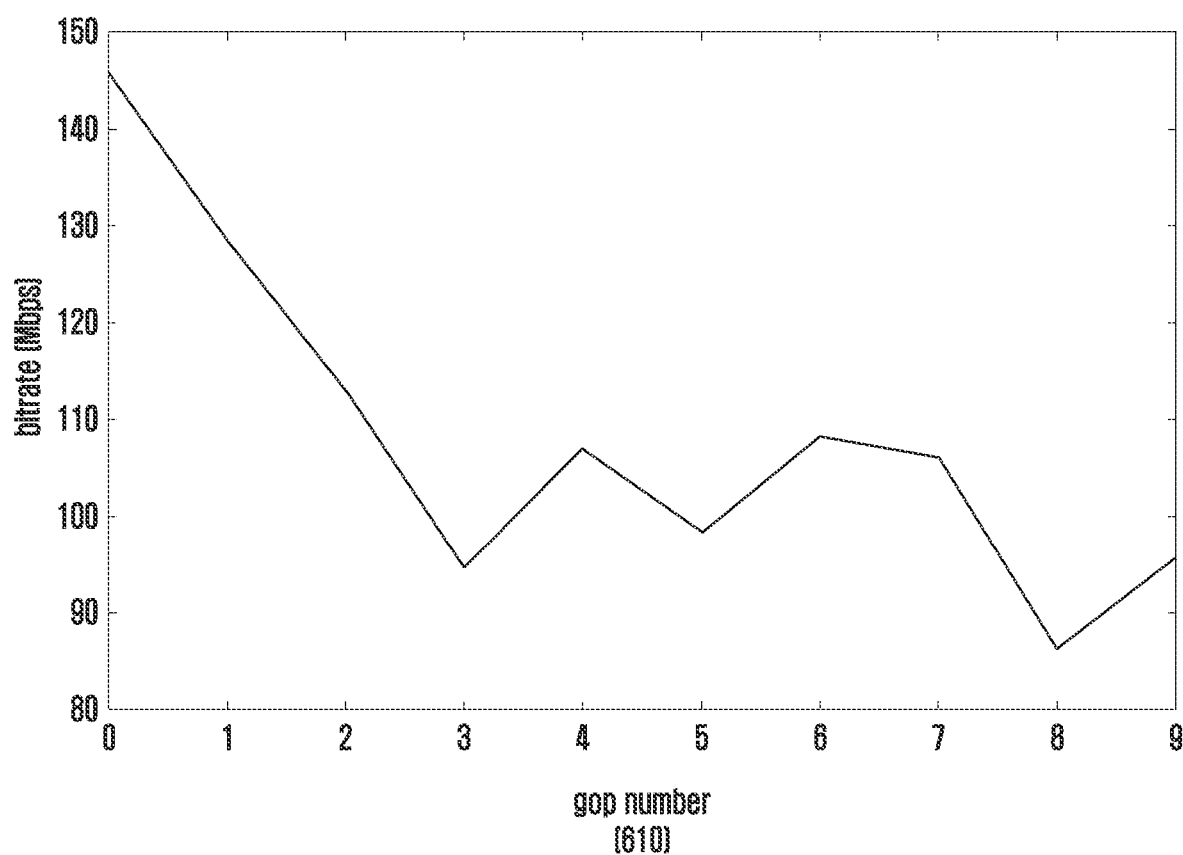
FIG. 6B illustrates a bitrate when an image is encoded while adjusting a maximum quantization value according to an embodiment of the disclosure.

FIG. 6B illustrates a bitrate when an image is encoded while adjusting a maximum quantization value according to an embodiment of the disclosure.

Referring to FIGS. 6A and 6B, the processor (e.g., the processor 310 of FIG. 3) may obtain a different bitrate for each frame set (e.g., the frame set 200 of FIG. 2). For example, the first bitrate may be obtained from the first frame set, and the second bitrate may be obtained from the second frame set. Because the processor must encode at or below the maximum allowable bitrate to generate a clear image, the bitrate of each frame set may be limited to or less than the maximum allowable bitrate. The processor may adjust the bitrate by increasing the quantization value when the bitrate of the frame set exceeds the maximum allowable bitrate. According to an embodiment, the processor may control a quantization value within a hardware-possible quantization value range (e.g., 0 to 51) and adjust the bitrate.

The first graph 600 of FIG. 6A is the bitrate when the maximum quantization value is not adjusted, and the second graph 610 of FIG. 6B is the bitrate when the image is encoded while the maximum quantization value is adjusted. The bitrate range illustrated in the first graph 600 is much wider than the bitrate range illustrated in the second graph 610. When the processor adjusts the bitrate by setting the maximum quantization value, the first few frame sets may obtain a high bitrate, but may lower the bitrate by increasing the maximum quantization value. After that, when the bitrate obtained from the image increases, the maximum quantization value is further increased, and when the bitrate obtained from the image decreases, the maximum quantization value is further decreased to obtain a stable bitrate and adjust the image quality.

For example, in the first graph 600, the bitrate obtained by the processor in the seventh frame set recorded a maximum of about 150 Mbps, whereas in the second graph 610, the bitrate obtained in the seventh frame set was about 110 Mbps, and as a result, it may be confirmed that there is no significant difference from the bitrate of the previous frame set. This may be because, although the seventh frame set has high complexity, the processor increases the maximum quantization value to decrease the bitrate.

Figure 7:
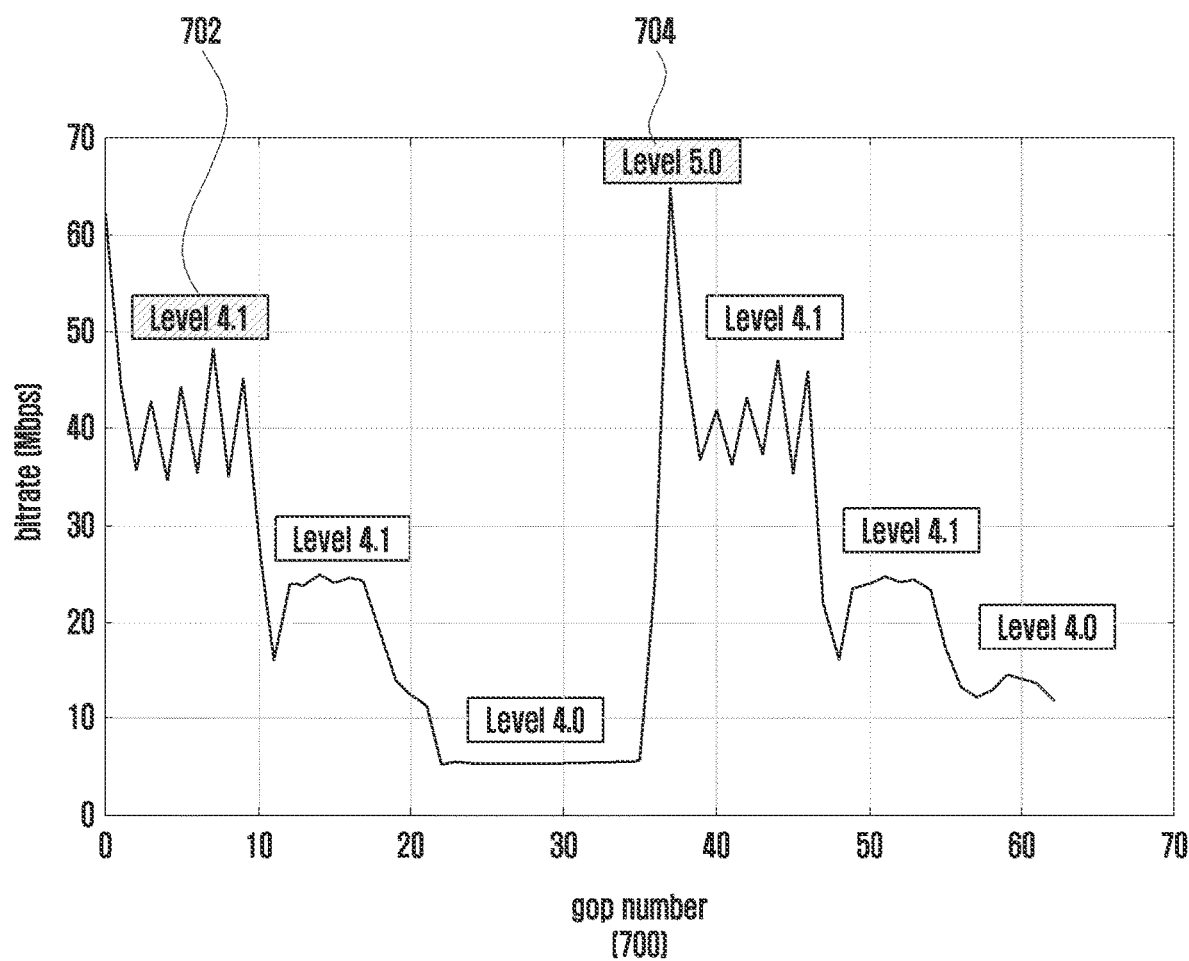
FIG. 7 illustrates a change in a resource level of an electronic device according to an embodiment of the disclosure.

FIG. 7 illustrates a change in a resource level of an electronic device according to an embodiment of the disclosure.

Referring to FIG. 7, the processor (e.g., the processor 310 of FIG. 3) may obtain a different bitrate for each frame set (e.g., the frame set 200 of FIG. 2). For example, the first bitrate may be obtained from the first frame set, and the second bitrate may be obtained from the second frame set. The processor may determine the resource level according to the maximum bitrate. Hereinafter, a method of determining the resource level will be described in detail.

According to various embodiments, the processor may determine a resource level of an image to be encoded. The processor may determine the resource level of the image based on at least one of a resolution, the number of buffers, and a maximum bitrate required for image reproduction. The resolution may depend on the number of pixels of the image reproducing device, the number of buffers may depend on the number of previous frames that can be referenced for encoding of the current frame, and the maximum bitrate may refer to a maximum bitrate required to encode the original image. The processor may determine a corresponding resource level while encoding the original image, and record the resource level in a stream header of the image.

According to various embodiments, the processor may determine a resource level from the frame set, and determine the highest level among them as the resource level of the image. For example, the processor may encode the first frame set with the first resolution, the first number of buffers, and the first maximum bitrate, and determine the resource level as the first resource level. The processor may store the determined resource level in a memory (e.g., the memory 340 of FIG. 3). The processor may encode a second frame set consecutive to the first frame set with a second resolution, a second number of buffers, and a second maximum bitrate, and determine the resource level as the second resource level. The processor may compare the determined second resource level with the first resource level stored in the memory and store the higher level in the memory. For example, if the first resource level is higher, the value stored in the memory may be maintained as it is, and if the second resource level is higher, the value stored in the memory may be deleted and the second resource level may be stored. In the same way, after the processor finishes determining and storing resource levels for all frame sets, the highest resource level may be stored in the memory. The processor may record the resource level stored in the memory in the stream header of the image.

In the graph illustrated in FIG. 7, the processor may determine a first resource level 702 of the first frame set, a second resource level of the second frame set, a third resource level of the third frame set, and a fourth resource level 704 of the fourth frame set. The processor may determine the first resource level 702 of the first frame set, and store it in the memory. Because the second resource level and the third resource level are equal to or lower than the first resource level 702, they may not be stored in the memory. Because the fourth resource level 704 is a higher value than the first resource level 702, the processor may delete the first resource level 702 from the memory and store the fourth resource level 704 in the memory. The processor may record the fourth resource level 704 in the stream header of the image.

An electronic device according to various embodiments may include a memory and a processor operatively connected to the memory, wherein the processor may obtain a maximum allowable bitrate of the electronic device, determine a maximum quantization value for encoding an image composed of at least one frame, obtain a first bitrate by encoding a first frame set of the image with a quantization value equal to or less than the maximum quantization value, increase the maximum quantization value if the obtained first bitrate exceeds the maximum allowable bitrate, decrease the maximum quantization value if the obtained first bitrate is less than or equal to the maximum allowable bitrate, obtain a second bitrate by encoding a second frame set subsequent to the first frame set of the image based on the increased or decreased maximum quantization value, increase the maximum quantization value if the obtained second bitrate exceeds the maximum allowable bitrate, and decrease the maximum quantization value if the obtained second bitrate is less than or equal to the maximum allowable bitrate.

According to various embodiments, the frame of the image may include at least one macroblock, and the processor may determine a quantization value for each macroblock.

According to various embodiments, the processor may determine at least one region of interest in the first frame set of the image, determine a maximum quantization value of the region of interest, and determine a quantization value that does not exceed the maximum quantization value of the region of interest based on the first bitrate of the image.

According to various embodiments, the processor may determine a first region of interest and a second region of interest from the first frame in the first frame set, determine priorities of the first region of interest and the second region of interest, assign a value smaller than a second maximum quantization value for the second region of interest to a first maximum quantization value for the first region of interest when the priority of the first region of interest is higher than the priority of the second region of interest, and assign a value greater than the second maximum quantization value to the first maximum quantization value when the priority of the second region of interest is higher than the priority of the first region of interest.

According to various embodiments, the processor may determine whether to reset a region of interest in the second frame subsequent to the first frame, reset a priority among the at least one region of interest when resetting the region of interest, and reset the maximum quantization value based on the priority.

According to various embodiments, the processor may compare the maximum quantization value initially assigned when determining the region of interest with the maximum quantization value of the region of interest in the current frame, and increase the maximum quantization value of the current frame when the maximum quantization value of the current frame is smaller than the maximum quantization value initially assigned.

According to various embodiments, the processor may obtain frame information including information on at least one of brightness, sensitivity, noise, and motion of the image, and determine a quantization value based on the frame information.

According to various embodiments, the processor may determine a resource level required to reproduce the image in a playback device, and store the determined resource level in a header of the image data.

According to various embodiments, the processor may determine a first resource level of the first frame set based on the first bitrate, determine a second resource level of the second frame set based on the second bitrate, and store the second resource level in the header of the image data when the second resource level is higher than the first resource level.

According to various embodiments, the processor may calculate a difference between the first frame of the image and the second frame subsequent to the first frame, and determine a higher quantization value as the difference between the first frame and the second frame increases.

According to various embodiments, the processor may determine a search range to refer to at least one previous frame in the current frame, and determine a lower quantization value as the search range is wide.

Figure 8:
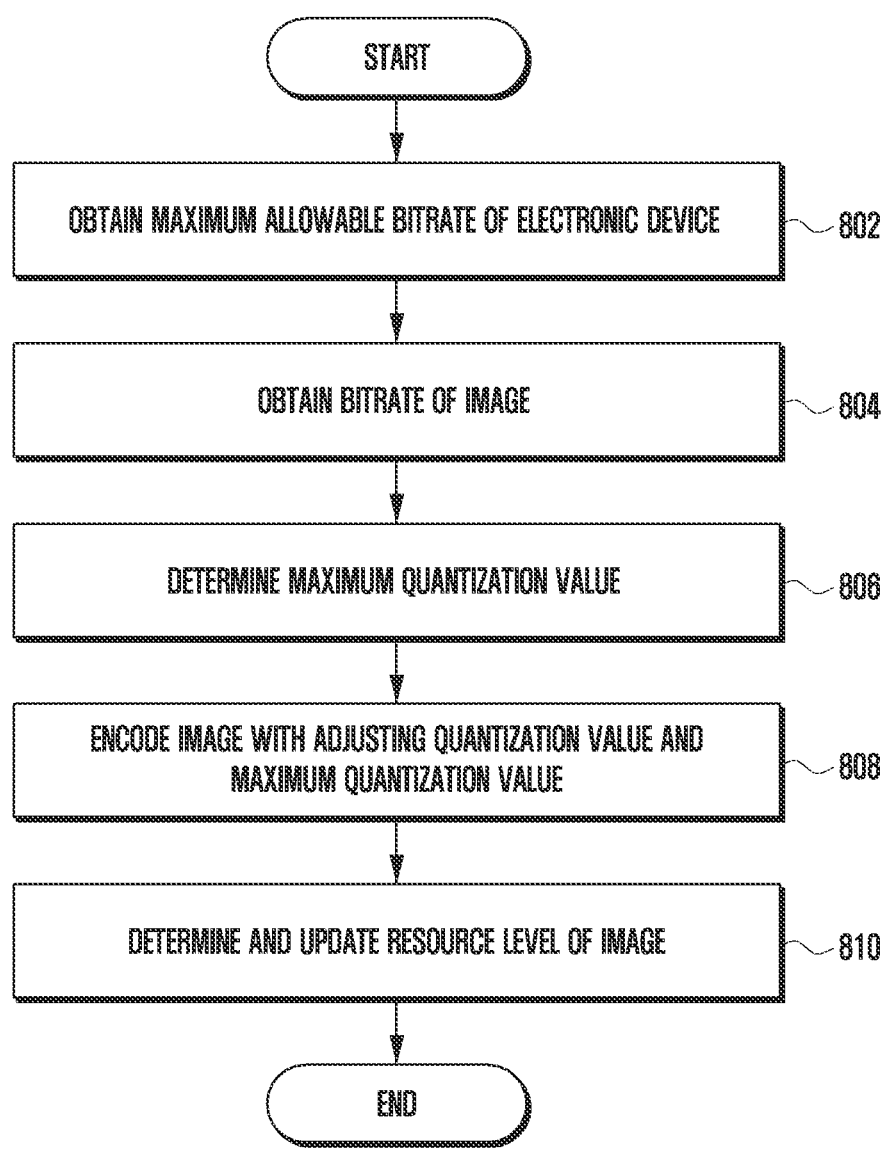
FIG. 8 is a flowchart of an encoding method through increase or decrease of a maximum quantization value according to an embodiment of the disclosure.

FIG. 8 is a flowchart of an encoding method through increase or decrease of a maximum quantization value according to an embodiment of the disclosure.

Referring to FIG. 8, according to various embodiments, in operation 802, the electronic device may obtain a maximum allowable bitrate. According to an embodiment, the maximum allowable bitrate may be determined according to a specification of a hardware codec (HW Codec), and may be the bitrate that the electronic device 300 can process in real time. For example, the electronic device may encode even if the bitrate of the original image exceeds the maximum allowable bitrate, but image quality may deteriorate and interruptions may occur.

According to various embodiments, the electronic device may determine the target bitrate for encoding the original image. According to an embodiment, the electronic device may determine the target bitrate according to the image quality and capacity size of an image to be encoded. According to another embodiment, the electronic device may determine the target bitrate of the original image as a default value without separately determining the target bitrate.

According to various embodiments, the electronic device may determine a frame number to encode the original image. The frame number may be the number of frames (e.g., 30) included in one frame set (e.g., the frame set 200 of FIG. 2). The frame number may be preset when the electronic device is manufactured, or may be determined differently according to an image encoded by the electronic device. Hereinafter, an original image will be described as including a first frame set and a second frame set consecutive to the first frame set, but the number of frame sets included in the original image is not limited thereto.

According to various embodiments, the electronic device may set at least one region of interest (ROI) (e.g., the region of interest 402 of FIG. 4A) in a frame set. The electronic device may determine a region including an important object, a region requiring clear image quality, or a high complexity region in the image as the region of interest. According to an embodiment, the electronic device may determine the entire screen of the original image as the region of interest. The electronic device may determine a region including the same object as the region of interest even in frames subsequent to the frame in which the region including one object is determined as the region of interest.

According to an embodiment, the electronic device may differently determine the region of interest for each frame set or frame. For example, in the case of an image in which a screen change occurs rapidly, different objects may appear for each frame, so the electronic device may set a different region of interest for each frame and/or frame set.

According to various embodiments, the electronic device may determine the priority of the region of interest. According to an embodiment, the electronic device may determine the priority according to the frequency of appearance of the object in the entire image.

According to various embodiments, the electronic device may obtain frame information including brightness, sensitivity, motion, and/or noise information of a frame set. The electronic device may determine the complexity of the image based on a change amount of brightness, sensitivity, motion, and/or noise information of a frame set. The electronic device may determine the bitrate to be encoded based on the determination of the complexity of the image. The electronic device may compress some data in order to identify the maximum allowable bitrate of the codec and encode the image at a bitrate that does not exceed the maximum allowable bitrate.

According to various embodiments, in operation 804, the electronic device may obtain the bitrate of the image. The higher the complexity determined based on the frame information, the higher the bitrate required for the electronic device to encode the frame set. According to an embodiment, the bitrate obtained by the electronic device may exceed the target bitrate. Because the electronic device does not compress the image above a certain level by limiting the quantization value, a large bitrate may be required when encoding the image, and when a high-complexity image is to be encoded in high quality, the obtained bitrate may be a value greater than or equal to the initially set target bitrate.

According to various embodiments, the electronic device may determine a quantization value for each frame of the frame set. According to an embodiment, electronic device may determine a different quantization value for each macroblock (e.g., macroblock 502 in FIG. 5A) constituting each frame. In this case, the quantization value cannot exceed the set maximum quantization value. When the maximum quantization value is not set in the uninterested region, the electronic device may increase the quantization value of the uninterested region to a hardware maximum (e.g., 50). The electronic device compresses data of a corresponding macroblock based on a quantization value set in the macroblock, and the larger the quantization value, the more data may be compressed. For example, the electronic device may store data having a small storage utilization by increasing the quantization value. The electronic device may set a quantization value of a macroblock corresponding to a region of interest among macroblocks to be lower than a quantization value of a macroblock other than the region of interest. For example, an image may be encoded by allocating a larger capacity to the region of interest, and a small capacity may be allocated to a macroblock other than the region of interest to encode the image so as not to exceed the maximum allowable bitrate.

According to an embodiment, the electronic device may set a lower quantization value for an image with higher correlation. For example, a low quantization value may be set for each macroblock in a frame set with high correlation because the difference between the first frame and the second frame subsequent to the first frame is not large. Conversely, in a frame set having a low correlation due to a large difference between the first frame and the second frame, a high quantization value may be set for each macroblock.

According to an embodiment, the electronic device may set a lower quantization value as the search range is wide. If the search range is wide, the electronic device may refer to more previous frames when encoding the current frame and may refer to a wider region within each frame. Accordingly, a low quantization value may be set because a bitrate required for the electronic device to encode an image is not large. Conversely, if the search range is narrow, the number of previous frames referenced when encoding the current frame may be small. If the search range is narrow, a bitrate required for the electronic device to encode an image is large, and thus a high quantization value may be set.

According to various embodiments, in operation 806, the electronic device may determine a maximum quantization value for each macroblock of the frame set. First, the electronic device may determine an initial maximum quantization value. According to an embodiment, the electronic device may set the initial maximum quantization value to be smaller as the priority region of interest is higher. According to an embodiment, the electronic device may maintain the maximum quantization value not to fall below the initial value. For example, the initial maximum quantization value may be a minimum value of the maximum quantization value.

According to another embodiment, the electronic device may also set the maximum quantization value in a region other than the region of interest (hereinafter, referred to as an uninterested region). The electronic device may set an appropriate maximum quantization value in order to reduce the difference in image quality between the region of interest and the uninterested region. The electronic device may set a maximum quantization value higher than that of the region of interest in the uninterested region. Through this, when the bitrate of the image increases, the electronic device may minimize the deterioration of the image quality of the region of interest and reduce the bitrate of the uninterested region to encode the image below the maximum allowable bitrate.

According to various embodiments, in operation 808, the electronic device may encode an image by adjusting a quantization value and a maximum quantization value of a macroblock. According to various embodiments, the electronic device may determine whether the bitrate of the frame set exceeds the maximum allowable bitrate. The electronic device may obtain the maximum allowable bitrate from the hardware codec and compare it with the bitrate of the obtained frame set. If the maximum allowable bitrate is exceeded, errors such as image quality deterioration and freezes may occur. Therefore, the electronic device may maintain the bitrate below the maximum allowable bitrate by adjusting the maximum quantization value.

According to various embodiments, the electronic device may adjust the maximum quantization value of the frame set. According to an embodiment, the electronic device may adjust the maximum quantization value according to the bitrate of the frame set and whether the bitrate of the frame set exceeds the maximum allowable bitrate. There is no problem when the maximum allowable bitrate is larger, but when the first bitrate is larger, the electronic device may increase the maximum quantization value of the first frame set.

Conversely, when the bitrate of the frame set is less than or equal to the maximum allowable bitrate, the electronic device may decrease the maximum quantization value. According to an embodiment, when the electronic device decreases the maximum quantization value, the image of the corresponding frame set may be encoded with higher image quality although the storage utilization increases. The electronic device may reduce the maximum quantization value in order to encode a high-definition image by maximally utilizing the resources of the electronic device. In this case, the electronic device cannot reduce the maximum quantization value below the initially set maximum quantization value. For example, the maximum quantization value may be adjusted within a range in which an initially set value becomes a minimum value. If the maximum quantization value is reduced from the initially set value, unnecessary information may be encoded and the storage utilization may become excessively large. Accordingly, the electronic device may determine the initial maximum quantization value to be a value in which sufficient image quality is maintained and the storage utilization is not excessively large.

The electronic device may encode the second frame set with the maximum quantization value increased or decreased in the encoding of the first frame set. Because the second frame set may include a different scene from the first frame set, the position of the region of interest may be moved. The electronic device may obtain a second bitrate necessary for encoding the second frame set. The processor 310 may determine whether the second bitrate exceeds the maximum allowable bitrate, and if the second bitrate is more than the maximum allowable bit, the maximum quantization value of the region of interest may be increased, and if the second bitrate is less than the maximum allowable bit, the maximum quantization value of the region of interest may be decreased. The electronic device may encode a next frame set subsequent to the second frame set using the changed maximum quantization value.

According to various embodiments, the electronic device may determine the resource level of the image and update to the stream header of the image in operation 810. The electronic device may determine the resource level based on at least one of a resolution required to reproduce an image, the number of buffers, and a maximum bitrate required to encode an image. According to an embodiment, because the electronic device obtains a bitrate required for image encoding according to the set maximum quantization value, the maximum bitrate required for image encoding may exceed the target bitrate. Accordingly, the electronic device may determine the resource level of the image after the image encoding process is complete.

The electronic device may record the resource level in a stream header of an image. Later, when the encoded image is reproduced, the external playback device may identify the resource level of the stream header and determine the type and number of resources required to reproduce the image.

Figure 9:
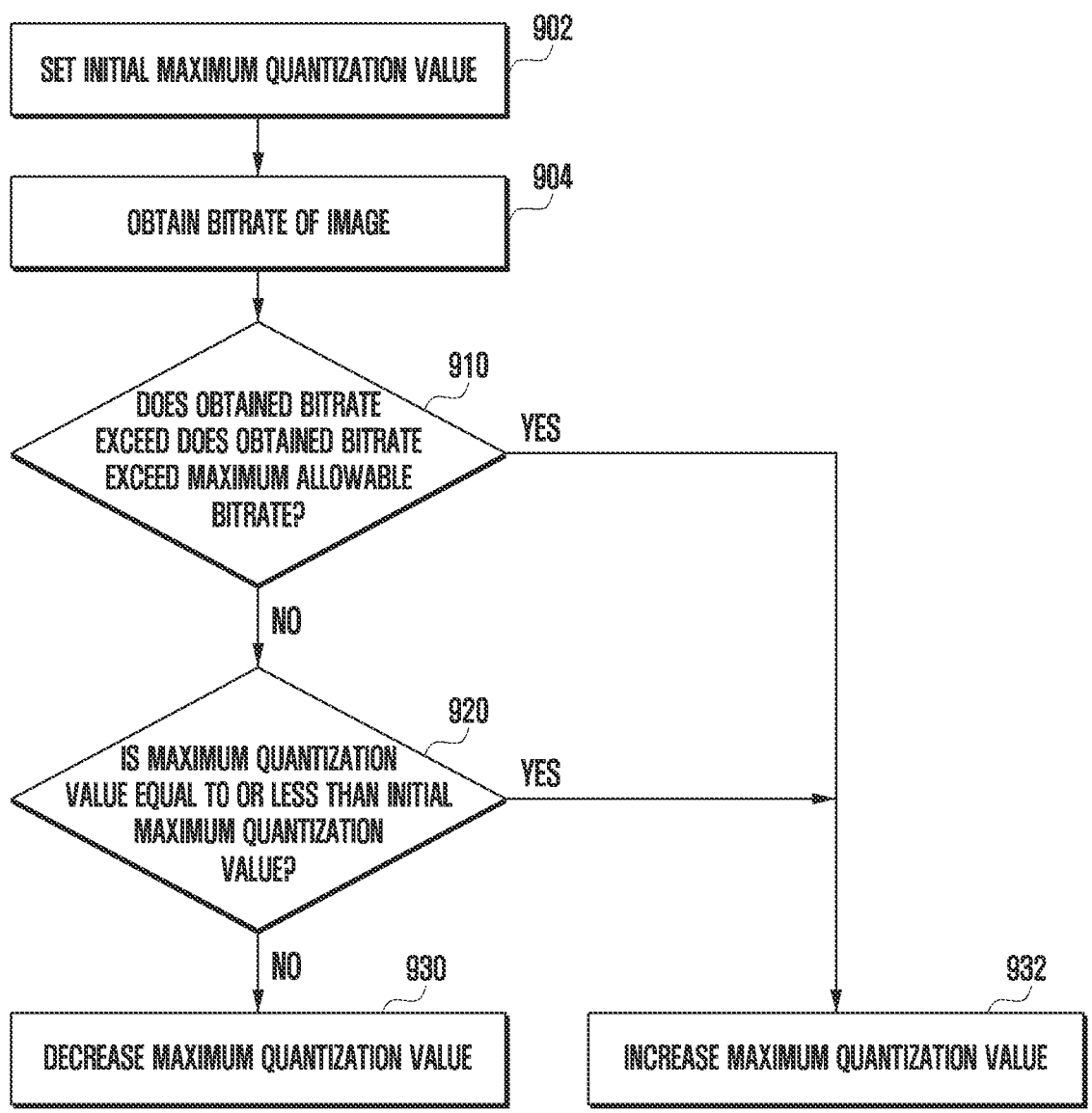
FIG. 9 is a flowchart of a method of adjusting a maximum quantization value according to an embodiment of the disclosure.

FIG. 9 is a flowchart of a method of adjusting a maximum quantization value according to an embodiment of the disclosure.

Referring to FIG. 9, according to various embodiments, in operation 902, the electronic device may set an initial maximum quantization value. According to an embodiment, the processor may differently set the initial maximum quantization value based on the priority of the region of interest (e.g., the ROI 402 of FIG. 4A). For example, the electronic device may set a lower initial value to the region of interest having a higher priority. By reducing the compression rate of the high-priority region, high-definition encoding is possible. According to an embodiment, the initial maximum quantization value set by the electronic device may be a minimum value of the maximum quantization value. For example, the electronic device may maintain a maximum quantization value equal to or greater than an initial value. This is for efficient encoding because if the maximum quantization value is too low, all unnecessary information is encoded and the storage utilization is increased.

According to various embodiments, in operation 904, the electronic device may obtain the bitrate of an image. The electronic device may identify at least one frame set and obtain a bitrate based on the complexity of the frame set. The electronic device may obtain the maximum allowable bitrate within a hardware.

According to various embodiments, in operation 910, the electronic device may determine whether the obtained bitrate exceeds the maximum allowable bitrate. The electronic device may obtain the maximum allowable bitrate within a hardware, and determine whether the bitrate of the current frame set exceeds the maximum allowable bitrate. When the bitrate of the frame set exceeds the maximum allowable bitrate, frame drop and/or image quality deterioration may occur, so it is necessary to reduce the bitrate.

According to various embodiments, in operation 920, the electronic device may determine whether the maximum quantization value of the frame set is equal to or less than an initial maximum quantization value. Because the initial value of the maximum quantization value set by the electronic device is the minimum value of the maximum quantization value, when the maximum quantization value falls below the initial value, the electronic device may increase the maximum quantization value to improve coding efficiency.

According to various embodiments, in operation 930, the electronic device may decrease the maximum quantization value. For example, the electronic device may decrease the maximum quantization value when the bitrate of the frame set does not exceed the maximum allowable bitrate and the maximum quantization value of the region of interest is not less than or equal to the initial value. When both conditions are satisfied, the electronic device may encode a high-definition image by reducing the maximum quantization value.

According to various embodiments, in operation 932, the electronic device may increase the maximum quantization value. For example, the maximum quantization value may be increased when the maximum quantization value of the region of interest falls below a set initial value even if the bitrate of the frame set exceeds the maximum allowable bitrate or does not exceed the maximum allowable bitrate. According to an embodiment, when the electronic device encodes an image exceeding the maximum allowable bitrate, an error may occur in the image. When the bitrate of the frame set increases, the electronic device may decrease the bitrate by increasing the quantization value of each macroblock (e.g., the macroblock 502 of FIG. 5A). However, because the maximum quantization value cannot be increased beyond the maximum quantization value, there is a limit to reducing the bitrate. Therefore, the bitrate may be further reduced by increasing the maximum quantization value.

Figure 10:
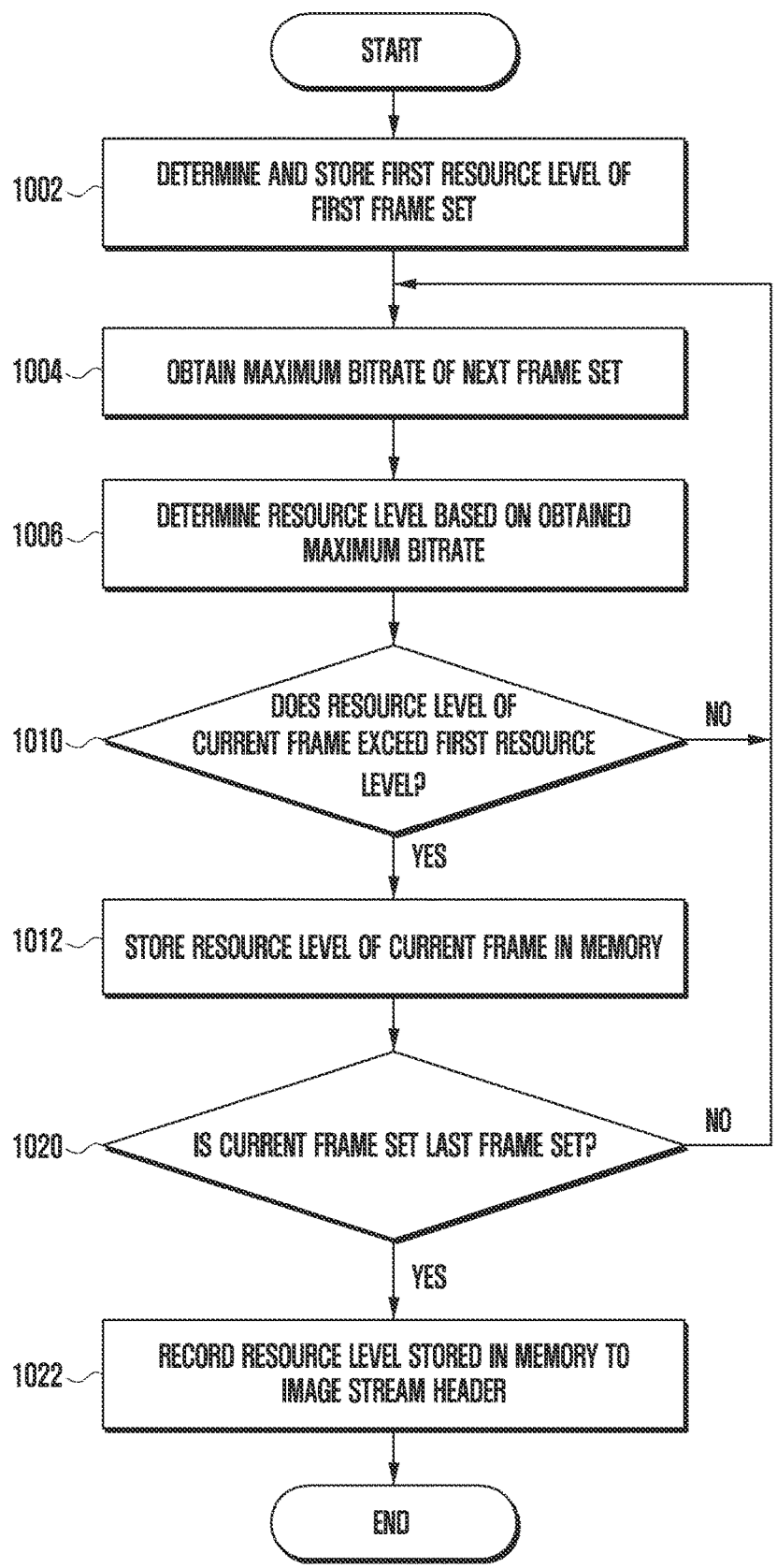
FIG. 10 is a flowchart of a method of determining and storing a resource level of an image according to an embodiment of the disclosure.

FIG. 10 is a flowchart of a method of determining and storing a resource level of an image according to an embodiment of the disclosure.

Referring to FIG. 10, according to various embodiments, in operation 1002, the electronic device may determine the first resource level of the first frame set and store it in a memory (e.g., the memory 340 of FIG. 3). The electronic device may determine the resource level of the image based on at least one of a resolution, the number of buffers, and a maximum bitrate required for image reproduction. The resolution may depend on the number of pixels of the image reproducing device, the number of buffers may depend on the number of previous frames that can be referenced for encoding of the current frame, and the maximum bitrate may refer to a maximum bitrate required to encode the original image. The electronic device may determine the resolution and the number of buffers of the first frame set, and determine the first resource level by obtaining the bitrate of the first frame set. The electronic device may store the determined first resource level in the memory.

According to various embodiments, in operation 1004, the electronic device may obtain the bitrate of the next frame set. For example, it is possible to obtain the bitrate for a second frame set subsequent to the first frame set.

According to various embodiments, in operation 1006, the electronic device may determine the resource level of the corresponding frame set based on the obtained bitrate. For example, the electronic device may determine the second resource level based on at least one of a resolution, a number of buffers, and a bitrate required to encode the second frame set. According to an embodiment, the electronic device may determine a higher resource level as more resources (e.g., resolution, number of buffers, and bitrate) required to encode a frame set are needed.

According to various embodiments, in operation 1010, the electronic device may determine whether the determined resource level exceeds the first resource level. For example, the electronic device may compare the magnitude of the second resource level for the second frame set with the magnitude of the first resource level stored in the memory. When the first resource level is higher, the electronic device may not delete the first resource level value stored in the memory. When the second resource level is higher than the first resource level, the electronic device may delete the first resource level value and store the second resource level.

According to various embodiments, in operation 1012, the electronic device may store the determined resource level in the memory. When the resource level of the current frame set is higher than the resource level stored in the memory, the electronic device may store the highest value among the resource levels of the frame set in the memory in order to help decoding an image using an appropriate resource in a playback device later.

According to various embodiments, in operation 1020, the electronic device may determine whether the current frame set is the last frame set. If the current frame set is not the last frame set, the electronic device may move to the next frame set and repeat operation 1004. The processor may repeat the operation of obtaining a resource level in all frame sets from the beginning to the end, and storing the higher resource level in the memory. Through this, the electronic device may obtain a resource level value reflecting the maximum bitrate of the image.

According to various embodiments, in operation 1022, the electronic device may record the resource level stored in the memory in the image stream header. When the current frame set is the last, the electronic device may complete the resource level updating. The electronic device may record the resource level stored in the memory in the stream header of the image to provide information on the appropriate amount of resources to be used later by the playback device to reproduce the image.

An encoding method with adjusting a maximum quantization value according to various embodiments may include obtaining a maximum allowable bit rate of an electronic device, determining a maximum quantization value of an image composed of at least one frame, obtaining a first bitrate by encoding a first frame set of the image with a quantization value equal to or less than the maximum quantization value, increasing the maximum quantization value if the obtained first bitrate exceeds the maximum allowable bitrate, decreasing the maximum quantization value if the obtained first bitrate is less than or equal to the maximum allowable bitrate, obtaining a second bitrate by encoding a second frame set subsequent to the first frame set of the image based on the increased or decreased maximum quantization value, increasing the maximum quantization value if the obtained second bitrate exceeds the maximum allowable bitrate, and decreasing the maximum quantization value if the obtained second bitrate is less than or equal to the maximum allowable bitrate.

According to various embodiments, the frame of the image may include at least one macroblock, and an encoding of the image may further include determining a quantization value for each macroblock.

According to various embodiments, the encoding of the image may further include determining at least one region of interest in the first frame set of the image, determining a maximum quantization value of the region of interest, and determining a quantization value that does not exceed the maximum quantization value of the region of interest based on the first bitrate of the image.

According to various embodiments, the determining the maximum quantization value of the region of interest may further include determining a first region of interest and a second region of interest from the first frame in the first frame set, determining priorities of the first region of interest and the second region of interest, assigning a value smaller than a second maximum quantization value for the second region of interest to a first maximum quantization value for the first region of interest when the priority of the first region of interest is higher than the priority of the second region of interest, and assigning a value greater than the second maximum quantization value to the first maximum quantization value when the priority of the second region of interest is higher than the priority of the first region of interest.

According to various embodiments, the increasing or decreasing the maximum quantization value may further include comparing the maximum quantization value initially assigned when determining the region of interest with the maximum quantization value of the region of interest in the current frame, and increasing the maximum quantization value of the current frame when the maximum quantization value of the current frame is smaller than the maximum quantization value initially assigned.

According to various embodiments, the encoding the image may further include obtaining frame information including information on at least one of brightness, sensitivity, noise, and motion of the image, and determining a quantization value based on the frame information.

According to various embodiments, determining a resource level required to reproduce the image in a playback device, and storing the determined resource level in a header of the image data may be further included.

According to various embodiments, the determining the resource level may further include determining a first resource level of the first frame set based on the first bitrate, determining a second resource level of the second frame set based on the second bitrate, and storing the second resource level in the header of the image data when the second resource level is higher than the first resource level.

According to various embodiments, the encoding the image may further include determining a difference between the first frame of the image and the second frame subsequent to the first frame, and determining a higher quantization value as the difference between the first frame and the second frame increases.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:
1. An electronic device comprising:
a memory; and
a processor operatively connected to the memory, wherein the processor is configured to:
obtain a maximum allowable bitrate of the electronic device,
determine a maximum quantization value for encoding a video composed of a plurality of frames,
obtain a first bitrate by encoding a first frame set of the video with a quantization value equal to or less than the maximum quantization value,
increase the maximum quantization value in response to the obtained first bitrate exceeding the maximum allowable bitrate,
decrease the maximum quantization value in response to the obtained first bitrate being less than or equal to the maximum allowable bitrate,
obtain a second bitrate by encoding a second frame set subsequent to the first frame set of the video, based on the increased or decreased maximum quantization value,
increase the maximum quantization value in response to the obtained second bitrate exceeding the maximum allowable bitrate,
decrease the maximum quantization value in response to the obtained second bitrate being less than or equal to the maximum allowable bitrate,
determine a first resource level of the first frame set based on the first bitrate,
determine a second resource level of the second frame set based on the second bitrate, and
store the second resource level in a header of video data when the second resource level is higher than the first resource level, and
wherein a resource level is required to reproduce the video in a playback device.

2. The electronic device of claim 1,
wherein the plurality of frames of the video comprises at least one macroblock, and
wherein the processor is further configured to determine a quantization value for each macroblock.

3. The electronic device of claim 1, wherein the processor is further configured to:
determine at least one region of interest in the first frame set of the video,
determine a maximum quantization value of the at least one region of interest, and
determine a quantization value that does not exceed the maximum quantization value of the at least one region of interest, based on the first bitrate.

4. The electronic device of claim 3, wherein the processor is further configured to:
determine a first region of interest and a second region of interest from a first frame in the first frame set,
determine priorities of the first region of interest and the second region of interest,
assign a value smaller than a second maximum quantization value for the second region of interest to a first maximum quantization value for the first region of interest when a priority of the first region of interest is higher than a priority of the second region of interest, and
assign a value greater than the second maximum quantization value to the first maximum quantization value when the priority of the second region of interest is higher than the priority of the first region of interest.

5. The electronic device of claim 4, wherein the processor is further configured to:
determine whether to reset a region of interest in a second frame subsequent to a first frame,
reset a priority among the at least one region of interest when resetting the at least one region of interest, and reset the maximum quantization value based on the priority.

6. The electronic device of claim 3, wherein the processor is further configured to:
compare, when determining the at least one region of interest, an initially assigned maximum quantization value with the maximum quantization value of the at least one region of interest in a current frame, and
increase the maximum quantization value of the current frame when the maximum quantization value of the current frame is smaller than the maximum quantization value initially assigned.

7. The electronic device of claim 1, wherein the processor is further configured to:
obtain frame information comprising information on at least one of brightness, sensitivity, noise, and motion of the video, and
determine a quantization value based on the frame information.

8. The electronic device of claim 1, wherein the processor is further configured to:
determine a search range to refer to at least one previous frame in a current frame; and
determine a lower quantization value as a number of previous frames of at least one previous searched increases.

9. A method of encoding with adjusting a maximum quantization value, the method comprising:
obtaining a maximum allowable bitrate of an electronic device;
determining a maximum quantization value of a video composed of a plurality of frames;
obtaining a first bitrate by encoding a first frame set of the video with a quantization value equal to or less than the maximum quantization value;
increasing the maximum quantization value in response to the obtained first bitrate exceeding the maximum allowable bitrate;
decreasing the maximum quantization value in response to the obtained first bitrate being less than or equal to the maximum allowable bitrate;
obtaining a second bitrate by encoding a second frame set subsequent to the first frame set of the video, based on the increased or decreased maximum quantization value;
increasing the maximum quantization value in response to the obtained second bitrate exceeding the maximum allowable bitrate;
decreasing the maximum quantization value in response to the obtained second bitrate being less than or equal to the maximum allowable bitrate;
determining a first resource level of the first frame set based on the first bitrate;
determining a second resource level of the second frame set based on the second bitrate; and
storing the second resource level in a header of video data when the second resource level is higher than the first resource level,
wherein a resource level is required to reproduce the video in a playback device.

10. The method of claim 9,
wherein a frame of the video comprises at least one macroblock, and
wherein the encoding of the video further comprises determining a quantization value for each macroblock.

11. The method of claim 9, wherein the encoding of the video further comprises:
determining at least one region of interest in the first frame set of the video;
determining a maximum quantization value of the at least one region of interest; and
determining a quantization value that does not exceed the maximum quantization value of the at least one region of interest based on the first bitrate.

12. The method of claim 11, wherein the determining of the maximum quantization value of the at least one region of interest further comprises:
determining a first region of interest and a second region of interest from the first frame in the first frame set;
determining priorities of the first region of interest and the second region of interest;
assigning a value smaller than a second maximum quantization value for the second region of interest to a first maximum quantization value for the first region of interest when a priority of the first region of interest is higher than a priority of the second region of interest; and
assigning a value greater than the second maximum quantization value to the first maximum quantization value when the priority of the second region of interest is higher than the priority of the first region of interest.

13. The method of claim 9, wherein the increasing or decreasing of the maximum quantization value further comprises:
comparing when determining at least one region of interest, an initially assigned maximum quantization value, with the maximum quantization value of the at least one region of interest in a current frame; and
increasing the maximum quantization value of the current frame when the maximum quantization value of the current frame is smaller than the maximum quantization value initially assigned.

14. The method of claim 9, wherein the encoding of the video further comprises:
obtaining frame information comprising information on at least one of brightness, sensitivity, noise, and motion of the video; and
determining a quantization value based on the frame information.

15. The method of claim 10, wherein, when the maximum quantization value is not set in an uninterested region, increasing the quantization value of the uninterested region to a hardware maximum.

16. The method of claim 15, further comprising compressing data of a corresponding macroblock based on a quantization value set in the macroblock,
wherein the quantization value is proportional to an amount of data to be compressed.

17. The method of claim 16, further comprising setting a quantization value of a macroblock corresponding to at least one region of interest among the macroblocks to be lower than the quantization value of the macroblock of the uninterested region.

* * * * *